G. WATERS.
Beer Cooler.
No. 50,056.
Patented Sept. 19, 1865.
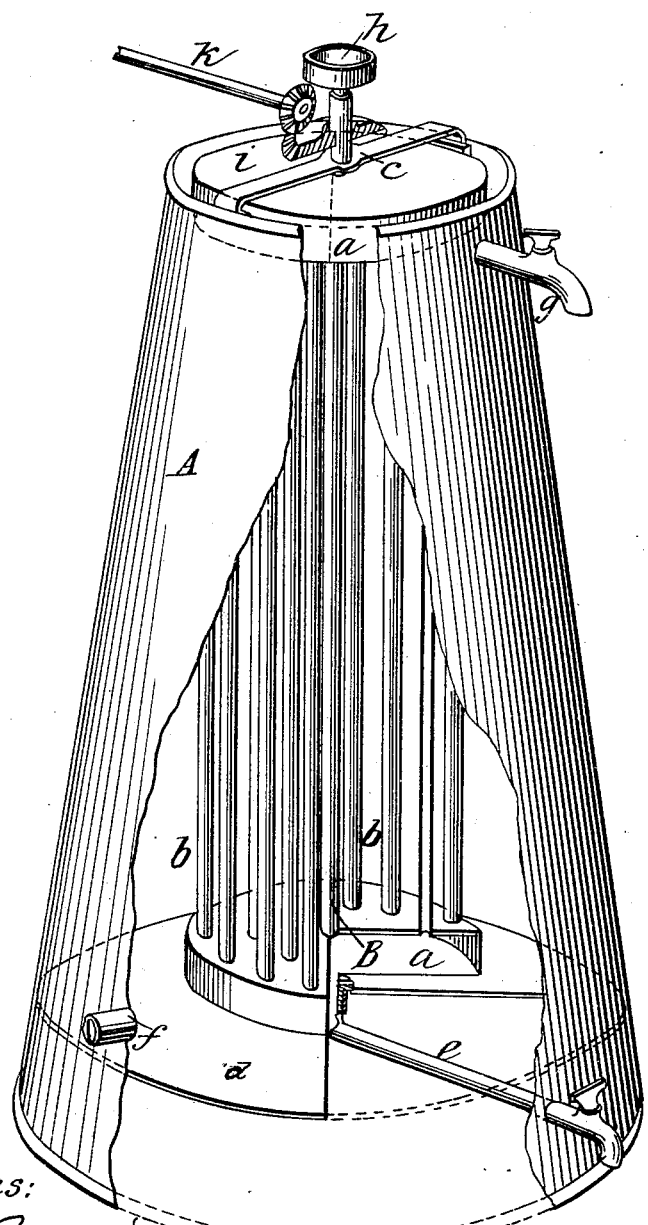

UNITED STATES PATENT OFFICE.

GARDNER WATERS, OF CINCINNATI, OHIO.

IMPROVEMENT IN BEER-COOLERS.

Specification forming part of Letters Patent No. 50,056, dated September 19, 1865.

*To all whom it may concern:*

Be it known that I, GARDNER WATERS, of the city of Cincinnati, in the county of Hamilton and State of Ohio, have invented a new and useful Improvement in Beer-Coolers; and I do hereby declare the following to be a full, clear, and exact description of the same, reference being had to the drawing of the cooler accompanying this specification, and to the letters of reference marked thereon.

My invention relates to a method of cooling beer by a continuous process; and it consists in the employment of a cylinder of pipes in which the beer is contained, or through which the beer passes, the said cylinder being made to revolve in a vessel of water, arrangements being provided for supplying cold water to the vessel continuously, and for taking off the water as its temperature is raised by abstracting heat from the beer.

The accompanying drawing is a perspective view of my apparatus, some portions being represented as broken away to disclose more fully the construction of the entire cooler.

A is the outer case, in which water is contained.

B is a lantern-cylinder, constructed as follows: $a\ a$ are the cylinder-heads, which are hollow or chambered, as represented. $b\ b$ are pipes connecting the heads $a\ a$, a large number of them being employed. These pipes open into the hollow spaces in the cylinder-heads.

$c$ is a central pipe, which also serves as a shaft for supporting the upper end of the cylinder, a corresponding pipe-shaft being employed at the lower end of the cylinder, the latter passing through a stuffing-box, to prevent the escape of water from the case A, and being connected below the bottom $d$ of the case A by a beer-tight joint with the horizontal discharge-pipe $e$.

$f$ is a pipe for the admission of cold water to the case A, and $g$ is a pipe for the discharge of hot water from the same.

$h$ is a funnel emptying into the central pipe, $c$. This, if desirable, may be made in the shape of a pulley and receive a belt for giving motion to the cylinder.

At $i$ is represented a pair of miter-wheels, one upon the shaft $c$ and the other upon the horizontal shaft $k$, through which motion may be conveniently communicated to the cylinder B.

The operation of my apparatus is very simple, and will require but a few words of explanation. The beer to be cooled is allowed to flow through the funnel $h$ and central pipe, $c$, continuously into the open space in the upper cylinder-head, $a$. From here it passes down through the pipes $b$ into the open space in the lower cylinder-head, and from thence through the lower pipe-shaft into the horizontal pipe $e$, through which it is conducted off to an appropriate receptacle. Cold water is supplied from an adequate head through the pipe $f$, and as it becomes heated ascends and discharges through pipe $g$. A slow motion is communicated to the lantern-cylinder by a belt or gearing, as described, and this brings the surface of the pipes into contact with ever-changing portions of water, and causes the heat of the contained fluid to be rapidly absorbed thereby.

I have in this specification provided that the beer or fluid to be cooled shall be passed through the moving part of the apparatus, and the water or cooling medium through the outer and fixed case. The effect would be similar if the cooling medium were passed through the moving part and the fluid to be cooled were passed through the outer case. Should the apparatus be used in this manner, the direction of the currents should be reversed. The cooling medium should be admitted at the bottom, and the fluid to be cooled at the top or upper part in both cases.

Having now fully described my invention, what I claim as new, and desire to secure by Letters Patent of the United States, is the following:

The cooling of beer or other liquids by passing the same continuously through a cooling medium, or, vice versa, the cooling medium continuously through the beer, by means of the rotating lantern-cylinder B or its equivalent, and the outer case A, combined and arranged for the purpose, substantially as herein specified.

G. WATERS.

Witnesses:
D. L. REID,
H. NORTON.